United States Patent Office 3,148,944
Patented Sept. 15, 1964

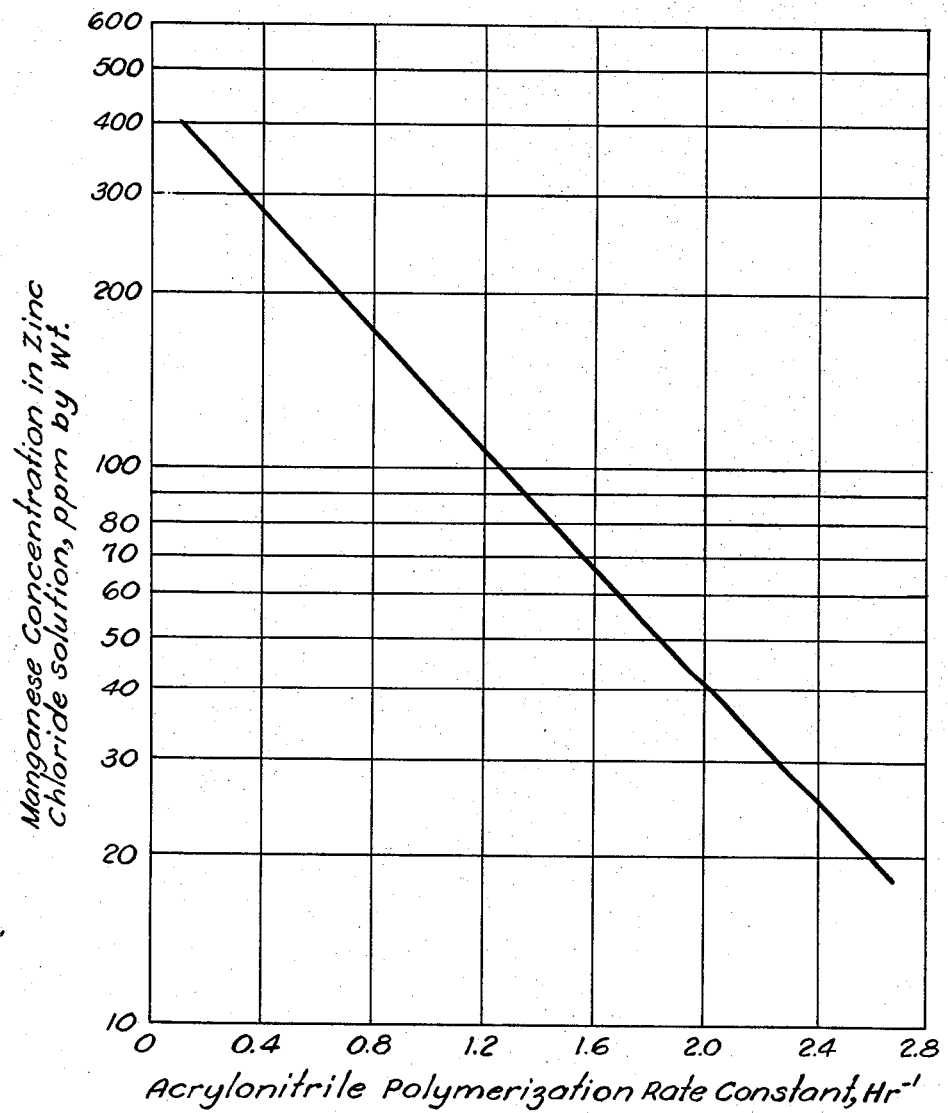

3,148,944
PROCESS FOR PURIFYING AQUEOUS SOLUTIONS COMPRISED OF ZINC CHLORIDE
Christiaan P. van Dijk, Poquoson, and Robert H. Wall, Williamsburg, Va., assignors to The Dow Chemical Company, Midland, Mich., a corporation of Delaware
Filed May 10, 1960, Ser. No. 28,138
16 Claims. (Cl. 23—97)

The present invention lies in the general field of inorganic chemistry and contributes particularly to the art of removing undesired metal ions from relatively concentrated aqueous solutions of certain salts. More particularly, it concerns an efficacious and advantageous technique and means for purifying the aqueous zinc chloride-containing saline solutions whose highly concentrated forms are solvents for polyacrylonitrile and the like, ordinarily fiber-forming, polymers in order to rid therefrom or accurately control therein the content of various ions, especially ions of manganese.

When polymerizing acrylonitrile and acrylonitrile-containing monomeric mixtures in aqueous saline solutions of the known type that are solvents for both monomeric and polymeric acrylonitrile, certain metallic ions that are frequently present as impurities in the saline solutions tend to seriously interfere with, if not entirely disrupt, the satisfactory maintaining of adequate polymerization rates and achievement of polymer products having desirable molecular weights. Furthermore, the presence of some ions may cause coloration of the polymer solution and the resulting polymer. This is particularly bothersome where the polymer is to be used for such end products as snythetic fibers.

It is known, by way of more specific delineation, that manganese as an impurity in zinc chloride solutions used for the preparation of acrylonitrile polymer products seriously affects the acrylonitrile polymerization rate and the control of polymer molecular weight. Additionally, as has been indicated, the presence of manganese may lead to disadvantageously discolored solutions.

As mentioned, and as is apparent to those who are skilled in the art, the aqueous salt solutions that are contemplated as capable of being benefited by practice of the present invention are those sufficiently concentrated dissolutions of certain inorganic salts comprised of zinc chloride that are generally adapted to dissolve both monomeric and polymeric acrylonitrile. Ordinarily, therefore, the salt solutions of interest for preparation of acrylonitrile polymer fiber-forming solutions are in concentrations on the order of 55 to 65 weight percent of dissolved salt, based on solution weight, and oftentimes are preferably about 60 weight percent solutions. Associated therewith, of course, are non-polymer-dissolving aqueous solutions of the same salts which, when such systems are utilized, are generally employed in relatively weaker concentrations as the coagulating liquids or spin baths for the fiber-forming compositions of the polyacrylonitrile-dissolving aqueous saline solvents; the latter being extruded or wet-spun into the former in the fiber-making operation. These coagulant liquids are usually composed of at least about 30–35 weight percent, usually at least about 40–45 percent, of dissolved salt. As indicated, such polyacrylonitrile-dissolving aqueous saline solvents and associated non-dissolving coagulant liquids (and the like) are advantageously made up with zinc chloride as at least the principal, if not the entire, saline constituent. If desired, preferred or otherwise necessary, however, aqueous solutions of various of the saline equivalents of zinc chloride for preparation of the zinc chloride-containing polyacrylonitrile-dissolving saline solvent and associated coagulating liquid systems may be satisfactorily and advantageously purified in accordance with the invention. These, as is well known, include various of the salt mixtures that are members of the so-called "lyotropic" series. Such aqueous zinc chloride-containing saline solvents and corresponding spin bath compositions for polyacrylonitrile have been disclosed, among other places, in United States Letters Patents Nos. 2,140,921; 2,425,192; 2,648,592; 2,648,593; 2,648,646; 2,648,648; and 2,648,649.

As a practical matter, especially for industrial purposes, the zinc chloride-containing polyacrylonitrile-dissolving aqueous saline solvents and the coagulating liquids associated therewith are prepared from commercial grades of salts suitable for such application. In this connection, the coagulating spin bath, non-polymer-dissolving compositions of the salts employed are generally not separately made (excepting perhaps initially in a given operation) but are obtained or derived during extrusion of the spinning composition itself into the spin bath wherein, during the manipulation and by constant adjustment or make-up with water, the salt solution is diluted to a suitable non-polymer-dissolving and efficient and effective coagulating level. Notwithstanding, the commercial or technical grades of zinc chloride, as they are generally available, will ordinarily be found to contain differing amounts, albeit material and oftentimes intolerable for polymerization purposes, of at least one and usually more of such constituents as aluminum, iron, manganese, chromium, lead, molybdenum and copper, as well as other contaminants.

There is disclosed in United States Letters Patent No. 2,746,840 that copper is particularly objectionable during polymerization of acrylonitrile in saline solutions. It is also indicated therein that, for such purposes, iron and manganese can be tolerated in higher concentrations than copper.

The mentioned patent teaches a method of removing many of the metallic ion impurities by treatment of the polyacrylonitrile-dissolving saline solution with an excess of a water soluble persulfate to form a precipitate of the impurities. Other known oxidizing agents may be used to cause precipitation of the undesired impurities in the form of their oxides, hydroxides, hydroxychlorides and so forth, as of iron and manganese.

One such reagent known to be adapted for the indicated purpose is potassium permanganate, even though it has most often been employed merely in analytical applications.

Potassium permanganate is especially suited for the purpose at hand, since it performs, in such treatment, a multifold service. This reagent (i.e., potassium permanganate) not only serves to generate insoluble precipitates, e.g., ferric hydroxide and manganese dioxide, but itself is reduced to insoluble manganese dioxide. The insoluble manganese dioxide precipitate assists materially in mechanically carrying down the total precipitate formed. Thus, it serves admirably as a collector. In order that a material serve as an efficient collector for facilitating precipitate removal, it must be sufficiently insoluble in the liquid medium being treated and must be of such physical consistency as to enable it to carry down suspended precipitates. Most important, the collector material must settle rapidly and must also be easily filterable.

Manganese dioxide (i.e., $MnO_2$) fits the requirements of a collector quite well in the purification of zinc chloride-containing polyacrylonitrile-dissolving aqueous saline solutions.

For oftentimes obscure reasons hereinafter more fully discussed and indicated, the treatment under the ordinary and generally conceived procedure with potassium permanganate (i.e., $KMnO_4$) of aqueous zinc chloride (i.e., $ZnCl_2$) solutions of suitable concentrations (about at least 55 weight percent $ZnCl_2$) for polymerization of acrylonitrile does not with total reliability or unfailing success produce sufficiently iron and manganese-free solutions to consistently assure and facilitate that adequate polymerization rates and sufficient molecular weights are ordinarily and without exception obtained and color contaminating constituents ordinarily and without exception removed.

In this connection, when a salt solution is to be used for only one polymerization, it is generally necessary to treat it only once in order to remove troublesome impurities. Usually, however, the salt solution will be used over many times, especially if a continuous process is involved where salt recycle is utilized. It then becomes necessary to treat the solution at required periodic intervals to keep down any build-up of contaminants that may accumulate from process equipment, pipes, etc. Iron is a notable cumulative contaminant from process equipment.

Despite the known possibility of purifying zinc chloride-containing salt solutions with potassium permanganate, it is nonetheless observed that on many occasions in certain batches and between treatments of polyacrylonitrile-dissolving aqueous saline solutions, the polymerization with a treated saline medium behaves erratically and proceeds, if at all, only with great difficulty, even after the $KMnO_4$ treatment accomplished according to the general procedures prescribed in the art. This is despite the inexplicable fact that seemingly the same treatment procedure is employed for such bad solutions as in other saline solvent batches treated pursuant to known techniques wherein polymerization goes with apparent ease.

It is believed that such unexpected and vexatious non-uniform result is due primarily to the presence in the saline solvent of manganese presumed (erroneously) to have been adequately removed. It is therefore readily apparent that efficient manganese removal is highly critical and requires a combination of procedures and treating techniques heretofore unrealized to be necessary and not previously contemplated to be in sorder. Such an improved procedure should, among other things, be adapted and calculated to overcome such phenomena tending to militate against effective manganese (and other metal ion) removal as transformation during the purifying treatment of ordinarily insoluble $MnO_2$ being transformed, as a result of the conditions experienced during treatment, into soluble forms of manganese.

It would be an advantage to be able to purify zinc chloride-containing polyacrylonitrile-dissolving aqueous saline solvents in such a way that, when such vehicles were employed as the solvent media in acrylonitrile polymerization reactions, sporadic and unpredictable behavior therewith could be reliably eliminated and uniform and reproducible results could be obtained both in the purification treatment and in resulting polymerizations using such solvents.

Accordingly, the chief aim and design of the present invention is to provide an attractive, reliable, certain and sure and consistently duplicatable means for removing, or at least controlling to tolerable levels, metal ions that are undesired as contaminants for purposes of polymerization in the zinc chloride-containing aqueous saline solutions, particularly those consisting of zinc chloride, that are solvents for monomeric and polymeric acrylonitrile. In this way, a means is advantageously provided whereby the sporadic behavior of acrylonitrile polymerization in aqueous zinc chloride or zinc chloride-containing solutions is eliminated. Practice of the technique of the invention possibilitates, on an assured basis, the realization of uniform and reproducible results.

Other objects, and the many cognate benefits and advantages of practice pursuant to the present invention, appear and are more fully manifest in the ensuing specification and description.

Achievement of the indicated ends in and by practice of the present invention, as is hereinafter more particularly delineated and made evident, depends essentially on the close, simultaneous regulation in a zinc chloride-containing polyacrylonitrile-dissolving aqueous saline solvent of several critical variables within precise and purposive ranges during purification treatment with potassium permanganate, including pH, temperature and time of contact of the precipitated contaminant (especially manganese) being removed from the solution, as well as level of ethylenically unsaturated organic material (such as monomeric acrylonitrile) in the saline solvent. The latter feature, of course, becomes critical when the saline solvent is recycled for re-use in polymerization procedures.

Essentially, in order to reliably and reproducibly use potassium permanganate to remove manganese, iron and other undesired metallic contaminants from zinc chloride-containing polyacrylonitrile-dissolving aqueous saline solvents, particularly those consisting of zinc chloride, it is required that the treatment effected be such that:

(a) The pH of the solution be, or be adjusted to be in excess of about 5.6. The pH is taken into account on the basis of measurement of a 60 weight percent salt concentration solution diluted 9:1 with water (i.e., 9 parts by volume of water to each part by volume of 60 percent original salt solution). In any even, especially with media consisting of zinc chloride, satisfactory pH adjustment can be achieved with advantage by addition of up to ¾ weight percent of zinc oxide (i.e., ZnO), based on weight of saline solution being treated. Of course, when salts other than and additional to zinc chloride are present in the solution being treated, oxides and/or hydroxides corresponding to the salts in the saline solution, in amounts about proportional to the quantity of each saline solute in the solution, may be employed for the indicated buffering purpose. While the degree of basicity effected for the treatment is not of material consequence, it is ordinarily found unnecessary to adjust the solution beyond about pH 10 and, in most cases, entirely satisfactory results are achieved when the pH of the solution being treated is between about 5.6 and about 7. A pH adjustment, incidentally, is usually necessary for salt solutions being treated as recycled material from polymerization (or spin bath) sources, wherein, as is known, an acid condition is ordinarily maintained.

(b) Potassium permanganate is added in such a proportion as to provide about a stoichiometric quantity of the agent in respect of the metallic contaminants in the solution being treated that are oxidizable by potassium permanganate under the conditions of treatment to insoluble forms. As a minimum, the stoichiometric quantity is based at least on the amount of manganese in the solution and, preferable, on at least the total amount of manganese and iron in the solution. In this connection, care should be taken to avoid utilization of excess quantities of potassium permanganate which, if unreacted and permitted to remain in the treated liquids, tends to create purple color in the salt solution and may necessitate use of a reducing agent for elimination. This complicates the purification and metal contaminant removal procedure.

(c) The purification is accomplished at an ambient temperature, preferably in the 20–25° C. range, although temperatures between about 0° C. and 50° C. may be employed. Use of temperatures much in excess of 50° C. for the treatment tends to promote unwanted side reactions that compete with the oxidation of the manganese ion ($Mn^{++}$) to $MnO_2$.

(d) Contact time for treatment and filtration (or other removal) of the resulting oxidized insoluble forms of the metal contaminants such as $MnO_2$, must be as short as possible to avoid situations or conditions that might permit redissolution of the metal contaminants. This is particularly important insofar as $MnO_2$ is concerned, which, after the treatment, may tend to peptize and become colloidal and unfilterable, as well as possibly reducing back to $Mn^{++}$. The overall contact time during treatment, therefore, should not be substantially in excess of about 1 hour and preferably is minimized to a time period consuming no more than about 15–20 minutes.

(e) The content of ethylenically unsaturated monomeric materials, such as monomeric acrylonitrile, must be carefully controlled and maintained at a negligible minimum. This is extremely important for satisfactory operation, particularly when the saline solution being purified is a vehicle that is being or has been recycled through a previous polymerization step. To illustrate the undesired effect of residual monomer in the saline solution being treated, there is required about 1.40 pounds of potassium permanganate for every pound of monomeric acrylonitrile present in order to overcome the effects of the monomer before the oxidizing action of the reagent on the metal contaminants being removed can be realized. Of course, equivalent stoichiometric ratios for other ethylenically unsaturated monomeric material that may be present can be readily calculated on the basis of the molecular weight of given monomers. In addition, ethylenically unsaturated materials, such as monomeric acrylonitrile, tend, at least with some extent, to solubilize at least certain of the precipitated metal contaminants as, for example, by reducing $MnO_2$ to $Mn^{++}$. This, as a consequence, adds the undesired metal contaminants, such as manganese, back to the solution and cannot be avoided unless large excess quantities of the permanganate reagent are utilized. This, as indicated above, is basically undesirable and, when ethylenically unsaturated residual monomer is present, also tends to create too much $MnO_2$ precipitate which is difficult to filter or otherwise remove, as well as adding $K^+$ ions to the solution. Therefore, it is generally preferable to maintain the quantity of residual acrylonitrile monomer in the solution being treated less than about 0.1 weight percent, based on the weight of the solution. Of course, when other ethylenically unsaturated monomers are involved the tolerable limits to be effected therefor are proportionate, on a percentage by weight basis, to their molecular weight in respect of and as related to the molecular weight of acrylonitrile. As is readily apparent, the residual monomer content may be adjusted to a level within that prescribed by removal of unreacted monomer according to any suitable means well known to those skilled in the art.

The insoluble forms of the metal contaminants precipitated during the treatment may be removed from the solution in any desired manner or by any desired means, although filtration (frequently with assistance of a filter aid) is probably generally most expedient and convenient. Despite this, if desired, the precipitated material may be separated and removed by decantation procedures, centrifugation and so forth as will appear to those skilled in the art.

While it is generally most efficient and economical to treat the saline solutions being purified in the practice of the invention while they are in a highly concentrated, polymer-dissolving form, the procedure may be satisfactorily accomplished on any relatively concentrated zinc chloride-containing solution of interest intended to be purified for present purposes. As a practical matter, it is generally better for the solutions being treated to have a concentration of at least about 10 weight percent, based on solution weight, of dissolved salt and, more advantageously, at least about 25 weight percent of dissolved salt.

The invention is further exemplified in and by the following docent and non-limiting illustrations wherein, unless otherwise indicated, all parts and percentages are on a weight basis.

FIRST ILLUSTRATION—EFFECT OF MANGANESE ON POLYMERIZATION

The undesired effect of manganese content on the polymerization rate constant of acrylonitrile (VCN) in zinc chloride solution is portrayed graphically in the sole figure of the accompanying drawing. The data plotted in the graph was obtained by polymerizing VCN using a hydrogen peroxide catalyst in aqueous approximately 60 percent $ZnCl_2$ solution. As is evident in the figure, the rate constant decreases markedly with modest increases in manganese content. This demonstrates the necessity for efficient and reproducible removal of manganese in order to insure a satisfactory acrylonitrile polymerization process. In addition, the undesired effects of other metallic contaminants in concentrated salt solutions is discussed in the referred-to United States Letters Patent No. 2,746,840.

SECOND ILLUSTRATION—EFFECTS OF CONCENTRATION OF $KMnO_4$ ADDED AND TIME OF TREATMENT

A 100 ml. reactor was set up into which two separate streams were fed. One stream was an aqueous $KMnO_4$ solution that was fed into the reactor at a constant rate. The second stream was an aqueous zinc chloride solution buffered with ¾ percent of zinc oxide, to which was added 10 g./l. diatomaceous earth filter aid. The zinc chloride solution was pumped in at various concentrations and rates during three consecutive Runs "A," "B" and "C." The treatment in each case was done continuously at room temperature. The solutions were then filtered through a polyester fiber ("Dacron") fine filter cloth immediately after leaving the reactor. The results of the runs are shown in the following Table I:

Table I

RUN "A".—60 PERCENT ZINC CHLORIDE SOLUTION
[1 percent $KMnO_4$ solution fed at 4.2 ml./min. Initial Mn content in $ZnCl_2$ solution=270 p.p.m.]

| Flow Rate of $ZnCl_2$ Soln. (l./hr.) | Final Mn Content (p.p.m.) | Approx. Contact Time (min.) | Color of $ZnCl_2$ Soln. Filtrate |
|---|---|---|---|
| 4.9 | 86 | 1.3 | Brownish. |
| 3.1 | 21 | 2 | Slightly yellow. |
| 2.5 | 32 | 2.5 | Do. |
| 2.2 | 15 | 3 | Slightly pink. |

RUN "B".—40 PERCENT ZINC CHLORIDE SOLUTION
[1/2 percent $KMnO_4$ solution fed at 4.2 ml./min. Initial Mn content in $ZnCl_2$ solution=180 p.p.m.]

| Flow Rate of $ZnCl_2$ Soln. (l./hr.) | Final Mn Content (p.p.m.) | Approx. Contact Time (min.) | Color of $ZnCl_2$ Soln. Filtrate |
|---|---|---|---|
| 4.7 | 40 | 1.3 | Slightly yellow. |
| 4 | 41 | 1.6 | Do. |

RUN "C".—25 PERCENT ZINC CHLORIDE SOLUTION
[1/2 percent $KMnO_4$ solution fed at 9.5 ml./min. Initial Mn content in $ZnCl_2$ solution=112 p.p.m.]

| Flow Rate of $ZnCl_2$ Soln. (l./hr.) | Final Mn Content (p.p.m.) | Approx. Contact Time (min.) | Color of $ZnCl_2$ Soln. Filtrate |
|---|---|---|---|
| 4 | 63 | 1.6 | Yellowish. |
| 3.5 | 24 | 1.8 | Slightly yellow. |
| 3.3 | 13 | 1.9 | Essentially Clear. |
| 3 | 0 | 2 | Clear. |
| 2.5 | 6 | 2.5 | Slightly pink. |

As is evident in the preceding data, the color of the solutions improves towards clearness as the Mn content decreases. The change of color through clear to pink results from an excess of $KMnO_4$ and indicates the desirability to operate with stoichiometric quantities of $KMnO_4$ to oxidize the soluble manganese.

In each of Runs "A," "B" and "C," if the treated solutions were allowed to stand prior to filtering as long as about 15 minutes, the filtrates were much more highly discolored. This indicates that under such conditions the insoluble forms of manganese are reduced to soluble forms and, as an undesirable consequence, are permitted to pass through the filter.

In each of the following three illustrations, samples of aqueous $ZnCl_2$ solutions (about 60 percent) were treated with approximately stoichiometric quantities of $KMnO_4$ to oxidize the soluble forms of Mn in the solutions to insoluble forms. In each of the exemplifications one variable was changed and the other variables were held constant. Otherwise, the same general experimental procedure as in the second illustration was followed.

THIRD ILLUSTRATION—EFFECT OF pH ON MANGANOUS ION REMOVAL

*Table II*

| Run | pH of Solution | Excess ZnO (Wt. percent) to Raise pH above 5.6 | Initial Mn (p.p.m.) | Final Mn (p.p.m.) | Percent Mn Removed |
|---|---|---|---|---|---|
| "D" | 4.9 | | 144 | 100 | 24 |
| "E" | 4.9 | 0.46 | 144 | 71 | 50 |
| "F" | 4.9 | 0.96 | 144 | 42 | 71 |

FOURTH ILLUSTRATION—EFFECT OF TEMPERATURE ON MANGANOUS ION REMOVAL

*Table III*

| Run | Temp., °C. | Initial Mn (p.p.m.) | Final Mn (p.p.m.) | Percent Mn Removed |
|---|---|---|---|---|
| "G" | Boiling | 153 | 391 | −156 |
| "H" | do | 153 | 144 | +6 |
| "I" | Ambient (20–25) | 116 | 22 | +81 |
| "J" | do | 116 | 3 | +98 |

FIFTH ILLUSTRATION—EFFECT OF RESIDUAL VCN ON MANGANOUS ION REMOVAL

*Table IV*

| Sample | VCN in Solution (wt. percent) | Initial Mn (p.p.m.) | Final Mn (p.p.m.) | Percent Mn Removed |
|---|---|---|---|---|
| a | 0.1 | 149 | 209 | −40 |
| b | 0.1 | 160 | 207 | −29 |
| c | 0 | 240 | 25 | +90 |
| d | 0 | 121 | 40 | +67 |

Excellent results at least commensurate with those demonstrated in the foregoing can be achieved in the purification of other zinc chloride-containing solutions of the type described in the foregoing.

As is apparent, the present invention is particularly adapted to be practiced in the manner of a continuous operation. Although it may be performed according to batch-wise procedures, it is most advantageously and preferably accomplished by treating a continuously flowing stream of the salt solution to be purified in the manner described in the foregoing. Thus, the salt stream to be treated may be adjusted to the proper conditions for treatment, after which it is subjected to continuous addition of the potassium permanganate reagent prior to removal of the insolubilized metal contaminants (by filtration or otherwise) in such a way that the contact time for the reagent to operate between the time of its addition and the time of contaminant removal from the purified stream is within the general desirable limits prescribed in the foregoing.

The scope and purview of the invention is delineated more particularly in the hereto appended claims which, as has been indicated, are not intended to be limited by or restricted to specific details and particulars set forth in the foregoing description and specification.

What is claimed is:

1. The improvement in the art of purifying aqueous solutions comprised of zinc chloride whose highly concentrated forms are solvents for polyacrylonitrile and which solutions contain as impurities metal ion contaminants comprising at least trace amounts of manganese and iron ions which comprises the steps: (1) adjusting the pH of the solution to a pH between about 5.6 and about 10; (2) adding to the so adjusted solution, at a temperature between about 0° C. and about 50° C., about a stoichiometric quantity of potassium permanganate in respect of the metal ion contaminants in said solution that are oxidizable by potassium permanganate in the specified pH range to insoluble forms; (3) precipitating the metal ion materials oxidized to insoluble form by said potassium permanganate; and (4) removing the precipitated insoluble material from the purified salt solution; the time for performance of said steps (2), (3) and (4) being not substantially in excess of about one hour.

2. Practicing the improvement recited in claim 1 so that the quantity of potassium permanganate added in step (2) is stoichiometric at least in respect of the quantity of manganese and iron in the solution being treated.

3. Practicing the improvement recited in claim 1 so that the quantity of potassium permanganate added in step (2) is stoichiometric at least in respect of the quantity of manganese in the solution being treated.

4. Practicing the improvement recited in claim 1 at a temperature of about 20–25° C.

5. Practicing the improvement recited in claim 1 so that the precipitated insoluble material is removed in said step (4) by filtration.

6. Practicing the improvement recited in claim 1 so that the time for performance of said steps (2), (3) and (4) is less than about 20 minutes.

7. Practicing the improvement recited in claim 1 to purify an aqueous solution having a concentration of zinc chloride of at least about 10 weight percent, based on the weight of the solution.

8. Practicing the improvement recited in claim 1, and wherein said solution has been used to polymerize an ethylenically unsaturated monomeric material therein, with the extra step, additional to and in combination with those recited, of removing substantially all of any residual ethylenically unsaturated monomeric material in said salt solution being treated before said addition of potassium permanganate.

9. The improvement in the art of purifying aqueous zinc chloride solutions which have been used for polymerizing acrylonitrile therein and which contain at least about 25 weight percent, based on solution weight, of dissolved zinc chloride and which solutions contain as impurities metal ion contaminants comprising at least trace amounts of manganese and iron ions which comprises the steps: (1a) adjusting the pH of the solution by addition thereto of up to about ¾ weight percent, based on solution weight, of zinc oxide so that the solution pH is between about 5.6 and about 10; (1b) keeping the content of residual acrylonitrile in the solution at a level less than about 0.1 weight percent, based on the weight of the solution; (2) adding to the so-adjusted and handled solution, at a temperature between about 0° C. and about 50° C., about a stoichiometric quantity of potassium permanganate at least in respect of the manganese and iron in said solution that are oxidizable by potassium permanganate in the specified pH range to insoluble forms; (3) precipitating the insolubilized manganese and iron material from solution; and (4) removing the precipitated manganese and iron material from the purified salt solution; the time for performance of said steps (2), (3) and (4) being not substantially in excess of about one hour.

10. The improvement in the art of purifying aqueous zinc chloride solutions which have been used for polymerizing acrylonitrile therein and which contain at least about 25 weight percent, based on solution weight, of dissolved zinc chloride and which solutions contain as impurities metal ion contaminants comprising at least trace amounts of manganese and iron ions which comprises the steps: (1a) adjusting the pH of the solution by addition thereto of up to about ¾ weight percent, based on solution weight, of zinc oxide so that the solution pH is between about 5.6 and about 10; (1b) keeping the content of residual acrylonitrile in the solution at a level less than about 0.1 weight percent, based on the weight of the solution; (2) adding to the so-adjusted solution, at a temperature between about 0° C. and about 50° C., about a stoichiometric quantity of potassium permanganate at least in respect of the manganese in solution that are oxidizable by potassium permanganate in the specified pH range to insoluble forms; (3) precipitating manganese dioxide from said solution; and (4) removing the precipitated manganese dioxide from the purified salt solution; the time for performance of said steps (2), (3) and (4) being not substantially in excess of about one hour.

11. Practicing the improvement recited in claim 10 at a temperature of about 20–25° C.

12. Practicing the improvement recited in claim 10 so that the time for performance of said steps (2), (3) and (4) is less than about 20 minutes.

13. Practicing the improvement recited in claim 10 to purify an aqueous solution consisting of about 60 weight percent zinc chloride.

14. Practicing the improvement recited in claim 10 on a continuous basis with a continuously flowing stream of the solution being treated.

15. Practicing the improvement recited in claim 9 on a continuous basis with a continuously flowing stream of the solution being treated.

16. Practicing the improvement recited in claim 1 on a continuous basis with a continuously flowing stream of the solution being treated.

References Cited in the file of this patent
UNITED STATES PATENTS

| | | |
|---|---|---|
| 1,706,196 | Vohl et al. | Mar. 19, 1929 |
| 2,395,221 | Hampel et al. | Feb. 19, 1946 |
| 2,746,840 | Davis | May 22, 1956 |